United States Patent
Eyring et al.

(10) Patent No.: US 8,435,918 B2
(45) Date of Patent: May 7, 2013

(54) COMPOSITE CERIA-COATED AEROGELS AND METHODS OF MAKING THE SAME

(75) Inventors: Edward M. Eyring, Salt Lake City, UT (US); Richard D. Ernst, Salt Lake City, UT (US); Gregory C. Turpin, Salt Lake City, UT (US); Brian C. Dunn, Bartlesville, OK (US)

(73) Assignee: University of Utah Research Foundation, Salt Lake City, UT (US)

( * ) Notice: Subject to any disclaimer, the term of this patent is extended or adjusted under 35 U.S.C. 154(b) by 1284 days.

(21) Appl. No.: 11/725,168

(22) Filed: Mar. 15, 2007

(65) Prior Publication Data
US 2007/0249494 A1    Oct. 25, 2007

Related U.S. Application Data

(60) Provisional application No. 60/782,791, filed on Mar. 15, 2006.

(51) Int. Cl.
| | |
|---|---|
| *B01J 23/00* | (2006.01) |
| *B01J 23/10* | (2006.01) |
| *B01J 23/70* | (2006.01) |
| *B01J 23/74* | (2006.01) |
| *B01J 23/42* | (2006.01) |
| *B01J 23/44* | (2006.01) |
| *B01J 23/02* | (2006.01) |
| *B01J 23/04* | (2006.01) |
| *B01J 23/72* | (2006.01) |
| *B32B 3/00* | (2006.01) |
| *B32B 3/26* | (2006.01) |

(52) U.S. Cl.
USPC ........... 502/304; 502/305; 502/319; 502/321; 502/325; 502/337; 502/338; 502/339; 502/344; 502/345; 502/349; 502/350; 502/353; 428/312.2

(58) Field of Classification Search ................. 502/304, 502/305, 319, 321, 325, 337–339, 344, 345, 502/349, 350, 353; 423/335–340; 428/312.2
See application file for complete search history.

(56) References Cited

U.S. PATENT DOCUMENTS

| | | | | |
|---|---|---|---|---|
| 4,550,093 | A | * | 10/1985 | Fanelli et al. .................. 502/107 |
| 2005/0277544 | A1 | * | 12/2005 | Mao ............................... 502/208 |
| 2006/0057400 | A1 | | 3/2006 | Ernst et al. |
| 2006/0116463 | A1 | | 6/2006 | Erkey et al. |

OTHER PUBLICATIONS

Pajonk, G.M. "Catalytic aerogels", Catalysis Today 35 (1997) 319-337.*
Jih Ru Hwu et al., Versatile reagent ceric ammonium nitrate in modern chemical synthesis, Current Science, Oct. 25, 2001, 1043-1053, vol. 81, No. 8.

(Continued)

*Primary Examiner* — Anthony J Zimmer
(74) *Attorney, Agent, or Firm* — Thorpe North & Western LLP

(57) ABSTRACT

Ceria-coated aerogels can include an aerogel support material having a stabilized ceria coating thereon. The ceria coating can be formed by solution or vapor deposition of alcogels or aerogels. Additional catalytic metal species can also be incorporated into the coating to form multi-metallic compounds having improved catalytic activity. Further, the ceria coated aerogels retain high surface areas at elevated temperatures. Thus, improvements in catalytic activity and thermal stability can be achieved using these ceria-coated composite aerogels.

9 Claims, 5 Drawing Sheets

OTHER PUBLICATIONS

Jih Ru Hwu et al., Ceric ammonium nitrate impregnated on silica gel in the removal of the tert-butoxycarbonyl group, ARKIVOC, 2002, 28-36, IX, Issue in Honor of Prof. James Bull.

Mary A. Thundathil et al., High Surface-Area Ceria Aerogel, J. Am. Ceram. Soc., 2004, 1442-1445, 87 [8].

Gregory C. Turpin et al., Modifications of Aerogel Structure and Composition for Water Gas Shift and Fishcer-Tropsch Reactions, Aug. 3, 2005, 24 pages, Department of Chemistry, Univeristy of Utah, Power Point Presentation.

Richard D. Ernst et al., Current and Future Research at the University of Utah, Jan. 5, 2006, 26 pages, Power Point Presentation.

C1 Chemistry for the Production of Ultra-Clean Liquid Transportation Fuels and Hydrogen, Jul. 11, 2005, 96 pages, Semi-annual six-month report, Research conducted Oct. 1, 2004 to Mar. 31, 2005, Consortium for Fossil Fuel Science.

P. Dutta et al., Characteristics of Cobalt Nanoneedles in 10% Co/Aerogel Fischer-Tropsch Catalyst, Chem. Mater., 2005, 5183-5186, 17.

Dae Jung Kim et al., SBA-15 Supported Cobalt and Iron Catalysts for Fischer-Tropsch Synthesis, Prepr. Pap.-Am. Chem. Soc., Div. Fuel Chem., 2005, 632-633, 50(2).

Gregory C. Turpin, Aerogel-Supported Transition Metal Catalysts for Fischer-Tropsch and Related Reactions, Prepr. Pap.-Am. Chem. Soc., Div. Fuel Chem. 2005, 602, 50(2).

Dae Jung Kim, Enhancement in the reducibility of cobalt oxides on a mesoporous silica supported cobalt catalyst, Chem. Commun., 2005, 1462-1464, The Royal Society of Chemistry, www.rsc.org/chemcomm.

Rehan Basta et al., Reactions of SF6 with Organotitanium and Organozirconium Complexes: The "Inert" SF6 as a Reactive Fluorinating Agent, J. Am. Chem. Soc., 2005-11924-11925, 127.

Dae Jung Kim et al., Mesoporous Silica Supported Cobalt Catalysts for Fischer-Tropsch Synthesis: Reducibility of Cobalt Oxides and Catalytic Activity, Fuel Chemistry Division Preprints, 2005, 2 pages.

Artur Braun et al., Ostwald ripening of cobalt precipitates in silica aerogels? An ultra-small-angle X-ray scattering study, J. Appl. Cryst, 2005, 132-138, 38.

Brian C. Dunn et al., Silica aerogel supported catalysts for Fishcer-Tropsch synthesis, Applied Catalysis A: General, 2005, 233-238, 278.

Brian C. Dunn et al., Cobalt and Ruthenium Fischer-Tropsch Catalysts Supported on Silica Aerogel., Prepr. Pap.-Am. Chem. Soc., Div. Pet. Chem., 4 pages, 2004, 49 (3&4).

Brian C. Dunn et al., Silica Xerogel Supported Cobalt Metal Fishcer-Tropsch Catalysts for Syngas to Diesel Range Fuel Conversion, Energy & Fuels, 2004, 1519-1521, 18.

Edward M. Eyring, Silica Aerogel Supported Catalysts for Fisher-Tropsch Synthesis, Jun. 8, 2004, Rocky Mountain ACS Meeting at Utah State University, Logan Utah.

Brian C. Dunn et al., Silica Aerogel Supported Catalysts for Fisher-Tropsch Synthesis, Prepr. Pap.-Am. Chem. Soc., Div. Fuel Chem, 2004, 2 pages, 49(1).

Brian C. Dunn et al., Fischer-Tropsch Catalysts Supported on Sol-Gel Derived Silica, Fuel Chemistry Division Preprints, 2 pages, 2003, 48(1).

* cited by examiner

US 8,435,918 B2

COMPOSITE CERIA-COATED AEROGELS AND METHODS OF MAKING THE SAME

RELATED APPLICATIONS

This application claims the benefit of earlier filed U.S. Provisional Application Ser. No. 60/782,791, filed Mar. 15, 2006, which is incorporated herein by reference in its entirety.

GOVERNMENT INTEREST

This invention was made with government support under Grant #DE-FC26-02NT41594 and Grant #DE-FC26-05NT42456 awarded by the United States Department of Energy. The Government has certain rights to this invention.

FIELD OF THE INVENTION

The present invention relates generally to aerogels and methods of making composite aerogels. More particularly, the present invention relates to specific coated aerogels which provide improved catalytic properties and thermal stability. Accordingly, the present invention involves the fields of chemistry, catalysis, and materials science.

BACKGROUND OF THE INVENTION

Catalyst materials can be provided in a wide variety of forms. High surface area, high selectivity, good reactivity, thermal stability, and ease of handling are some of the many factors which contribute to a good catalyst material. As a practical matter, many catalyst materials are formed on porous support materials to provide increased surface areas. Further, the support materials themselves can also contribute to the catalytic activity of a catalyst. A wide variety of porous support materials are available. Aerogels are one type of support material which provides very high surface areas and extremely low densities. In fact, aerogels are among the lowest density solid materials currently available. As a result, a number of efforts at developing aerogel supported catalyst materials have met with varying degrees of success. Most often the above factors are difficult to consistently and simultaneously satisfy. For example, aerogels generally are very fragile materials which tend to degrade in the presence of water and other solvents. Further, pure ceria aerogels tend to exhibit a significant loss of surface area at elevated temperatures.

In addition, catalyst manufacturing technologies generally produce randomly distributed metal oxides or metals and can suffer from non-selective deposition across the support surface. As a result, catalyst metals tend to associate with one another merely by proximity or by chance. This is especially problematic in multi-metallic catalysts where improved catalytic activity is the result of the combined synergistic effects of each of the constituent co-catalysts. In such products, conventional random deposition techniques result in reduced catalytic activity than might theoretically be expected from the combination of certain co-catalysts.

Therefore, materials and methods which provide improved catalyst support materials which avoid the above difficulties continue to be sought through ongoing research and development.

SUMMARY OF THE INVENTION

It has been recognized that it would be advantageous to develop improved catalyst support materials. Therefore, in one aspect of the present invention, a ceria-coated aerogel can include an aerogel support material having a stabilized ceria coating over at least a portion of porous surfaces throughout the aerogel support material.

In accordance with one aspect of the present invention, the ceria-coated aerogels can have a stabilized ceria coating which improves the thermal stability of the composite aerogel well above temperatures conventionally achievable using conventional pure ceria aerogels. In one detailed aspect the ceria-coated aerogels of the present invention can have less than about 5% loss in surface area up to about 650° C. compared to a surface area of the thermally stabilized ceria-coated aerogel at 250° C. Thus, the composite ceria-coated aerogels of the present invention are substantially free of loss in surface area over a wide range of catalytically useful temperatures. Generally, the composite aerogels of the present invention are substantially free of losses in surface areas, e.g. less than 5% loss, up to a temperature of about 400° C., and preferably up to a temperature of about 650° C. In another preferred aspect, the composite aerogels of the present invention can have less than about 2.5% loss, and most preferably less than 1.5% loss up to a temperature of about 650° C. compared to the stabilized aerogel at about 250° C.

In one specific aspect of the present invention, the ceria can be a cerium (IV) oxide. However, other ceria can also be suitable in some embodiments such as cerium (III) oxide.

The composite ceria-coated aerogels of the present invention can have a ceria coating which covers at least about 60% of a surface area of the aerogel support material, and preferably from about 65.8% to about 90.1% of the surface area of the aerogel support material. Yet another significant benefit of the composite aerogels of the present invention is the thermal stability combined with very high surfaces areas. Although the surface areas can vary somewhat depending on the specific aerogel support material chosen, as a general guideline surface areas can vary from about 300 m$^2$/g to about 600 m$^2$/g, and preferably from about 400 m$^2$/g to about 500 m$^2$/g.

In another detailed aspect of the present invention, the ceria-coated aerogel can have a cerium loading from about 10% to about 50%, and preferably from about 30% to about 45%. When using a solution deposition technique, the cerium loading can depend largely on the concentration of cerium in solution. Consequently, the choice of solvent can result in cerium loading outside the above ranges. Thus, as a general matter, cerium loading can range from about 10% to about 90%. Higher loading can be achieved by repeating cerium deposition processes. For example, after calcination to form an initial ceria coating, the deposition can be repeated. Subsequent deposition steps can be performed at liquid, vapor, or supercritical deposition conditions. Rewetting of dry aerogels can be achieved by various approaches such as but not limited to, based catalyzed sol-gel synthesis and curing with neat methanol. Alternatively, a more highly soluble cerium compounds such as cerous nitrate, ceria triflate or the like can be used, e.g. in supercritical media.

In still another aspect of the present invention, the aerogel support material can be almost any suitable aerogel. Non-limiting examples of suitable aerogel support materials include, or consist essentially of, silica aerogel, alumina aerogel, zirconia aerogel, titania aerogel, and composites or combinations thereof. Silica aerogel is currently a preferred aerogel support material for a variety of reasons such as surface areas, weight, expense, and thermal stability. In one detailed aspect, the aerogel support material can consist essentially of silica aerogel.

The composite ceria-coated aerogels of the present invention are particularly suited for formation of heterogeneous catalysts such that the ceria can be associated with one or more additional catalytically active metals or compounds to form a multi-metallic compound. A variety of techniques can be used to deposit additional metals, such as incipient wetness, aqueous impregnation, coprecipitation, and redox targeting. In one currently preferred approach, the additional catalytically active metal species can be selectively deposited and treated to form a multi-metallic compound with the ceria using a targeted reduction-oxidation approach as described in U.S. patent application Ser. No. 11/215,828, filed Aug. 30, 2005, which is incorporated herein by reference in its entirety.

The additional catalytically active metal species can include a wide variety of materials, depending on the desired catalytic activity and associated process for which the material will be used. Non-limiting examples of suitable catalytically active metal species include cobalt, ruthenium, iron, titanium, vanadium, chromium, zirconium, osmium, platinum, palladium, silver, nickel, molybdenum, tungsten, and compound or combinations thereof. Cobalt, ruthenium, and iron-based species are particularly suitable for many applications and are relatively inexpensive. Thus, the ceria can be either oxidized or reduced, depending on the additional metal compound and the cerium oxidation state. For example, Ce (III) oxide can be oxidized using a metal compound having a higher oxidation state. Alternatively, Ce(IV) oxide can be reduced using a metal compound having a lower oxidation state.

The composite ceria-coated aerogel materials of the present invention can be formed by depositing a cerium compound via solution deposition on an alcogel support material or via vapor deposition on an aerogel support material. Accordingly, in one aspect of the present invention, a method of preparing a ceria-coated aerogel can include depositing a cerium compound on an alcogel support material to form a cerium alcogel. The alcogel can be formed by contacting an existing aerogel with a fluid which can be used to non-destructively saturate the aerogel to form an alcogel structure. Alternatively, the alcogel support material can be formed from raw materials using conventional sol gel or other processes.

In one specific aspect of the present invention, the alcogel support material can be contacted with a cerium solution of the cerium compound for a sufficient time to coat surfaces of the alcogel with the cerium compound to form the cerium alcogel. Alternatively, the step of depositing the cerium compound can include contacting an aerogel support material, i.e. not alcogel, directly with a solution of the cerium compound.

The cerium solution can include a wide variety of cerium compounds which can be deposited on alcogel or aerogel surfaces. Non-limiting examples of suitable cerium compounds can include cerium (IV) alkoxide (e.g. cerium methoxyethanol, cerium isopropoxide), cerium acetylacetonate, cerium trifluoroacetyl acetonate, cerium hexafluoroacetyl acetonate, ceric ammonium nitrate, ceric ammonium sulfate, cerium nitrate, cerium chloride, cerium oxalate, cerium hydroxide, and combinations thereof. Many of these cerium compounds are commercially available as a hydrate, anhydrous, cerium (III) or (IV), and such variations are included as suitable cerium compounds. Currently, the preferred cerium compound is ceric ammonium nitrate, however, other cerium compounds can also provide acceptable cerium loading and ease of deposition.

In one embodiment of the present invention, once the cerium compound has been deposited, the cerium alcogel can be dried to form a precursor aerogel. For example, the cerium alcogel can be dried by subjecting the cerium alcogel to supercritical carbon dioxide conditions and then drying to form the precursor aerogel. Supercritical conditions can help to minimize loss of surface area, shrinking, and deformation of the aerogel during drying. Although exact conditions can vary, generally the cerium alcogel can be first equilibrated with liquid carbon dioxide at a pressure generally between about 1100 psig and about 2000 psig while maintaining a temperature below 32° C. to remove the preparation solvent from the alcogel. The resulting solution of liquid carbon dioxide and preparation solvent is dynamically exchanged with liquid carbon dioxide and simultaneous venting. After adequate exchange, the system can be heated to between about 32° C. and about 50° C. for a sufficient time, usually about 60 minutes, to achieve supercritical conditions. The supercritical carbon dioxide can be subsequently vented at an even rate for about 60 minutes to form the precursor aerogel. Completion of carbon dioxide/preparation solvent exchange can be determined by observing the relative absence of the preparation solvent in the exchange effluent. Additionally, drying can be achieved via supercritical conditions of the preparation solvent.

The precursor aerogel can be treated to form a stabilized ceria coating over at least a portion of the precursor aerogel to form a ceria-coated aerogel. Thus, in one aspect of the present invention, the deposited and dried cerium compound can be converted to ceria. In one detailed aspect, the precursor aerogel can be subjected to calcining at a temperature and time sufficient to form the stabilized ceria coating. Calcination can most often be performed in a furnace, e.g. muffle furnace, under oxygen conditions. Oxygen conditions can be provided by either a dedicated oxygen supply or by exposure to ambient air. In one aspect, the precursor aerogel can be heated to about 450° C. at a rate of about 5° C./min and then held at about 450° C. for about 4 hours under air. In general, temperatures from about 250° C. to about 350° C. can be useful in converting cerium compounds into ceria. An untreated aerogel can have higher mass due to presence of the precursor compound which also results in relatively low surface areas.

In another alternative aspect, the method of preparing a ceria-coated aerogel can include vapor depositing a cerium compound on an aerogel support material to form the ceria-coated aerogel. Currently preferred vapor deposition includes chemical vapor deposition, although other methods such as, but not limited to, atomic layer deposition, and the like can be suitable. Certain vapor deposition process conditions can also produce asperities on the order of nanometers which can be useful in increasing active surface area.

In one detailed aspect, the ceria can be directly vapor deposited on the aerogel support material. Alternatively, the vapor deposited cerium compound is not ceria such that an additional treatment of the cerium compound can be performed to form ceria. For example, a vapor deposited cerium compound can be subjected to calcining as described in connection with the solution deposition approach.

Regardless of the approach used to form a ceria coating over portions of the aerogel support material, the stabilized ceria coating can be a substantially monolayer of ceria. Alternatively, the ceria coating can be ceria aggregates clustered over portions of the aerogel support material, e.g. cluster diameters of about 7 nm are most common and appear to be independent of cerium loading. Thus, relatively expensive ceria can be selectively placed at surfaces which are most likely to actively contribute to catalytic activity. Rather than having substantial amounts of ceria or cerium compounds which are isolated or buried underneath other materials, effectively negating their catalytic contributions, the methods of the present invention allow for carefully directed and targeted placement of ceria to maximize exposure of ceria as active sites for deposition of additional catalytically active metals or as catalytic active sites alone.

As mentioned above, additional catalytic metals can be optionally associated with the ceria coating to form a multi-metallic compound. The multi-metallic compound can be formed with the stabilized ceria coating by reacting a secondary metal complex with the stabilized ceria coating in an oxidation-reduction reaction to form the multi-metallic compound. Thus, the additional metal species can be specifically targeted and deposited uniformly such that the ceria and additional metal species are associated with one another throughout substantially avoiding localized non-homogeneities. This targeted deposition can be performed on either a stabilized ceria coating or on the ceria precursor prior to stabilization. In some embodiments, the ceria precursors provide improved redox combinations that the stabilized ceria coating.

In yet another optional aspect of the present invention, the alcogel or aerogel support material can be silylated prior to the step of depositing the cerium compound. Alternatively, the ceria-coated composite aerogel can be silylated, e.g. prior to the incorporation of a secondary metal. For example, silylation of an alcogel generally requires the use of a solvent other than acetone, ethanol, alcohol, or water. Similarly, silylation of an aerogel can be performed using vapors of the silylation agent at reduced pressures. Silylation can include contacting the alcogel or aerogel support material with hexamethyldisilazane (HMDS), tetramethylsilane (TMS), trimethylchlorosilane (TMCS), t-butyldimethylsilyl (t-BDMS), dimethylsilyidiethylamine (DMSDEA), and combinations thereof, or other known silylation agents. Silylation can increase water stability of the aerogel materials of the present invention. Silylation can also improve selective or targeted deposition of catalysts or other metals by occupying silica sites and ensuring that targeted metals associate with the ceria.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying claims, or may be learned by the practice of the invention.

BRIEF DESCRIPTION OF THE FIGURES

FIG. 7 is a graph of temperature versus hydrogen consumption showing TPR profiles for ceria, 2% GPI Pd on ceria, and 2% solution phase deposited Pd on ceria in accordance with embodiments of the present invention. Profiles for 1% incorporation of Pd are similar.

DETAILED DESCRIPTION

Figure 1:
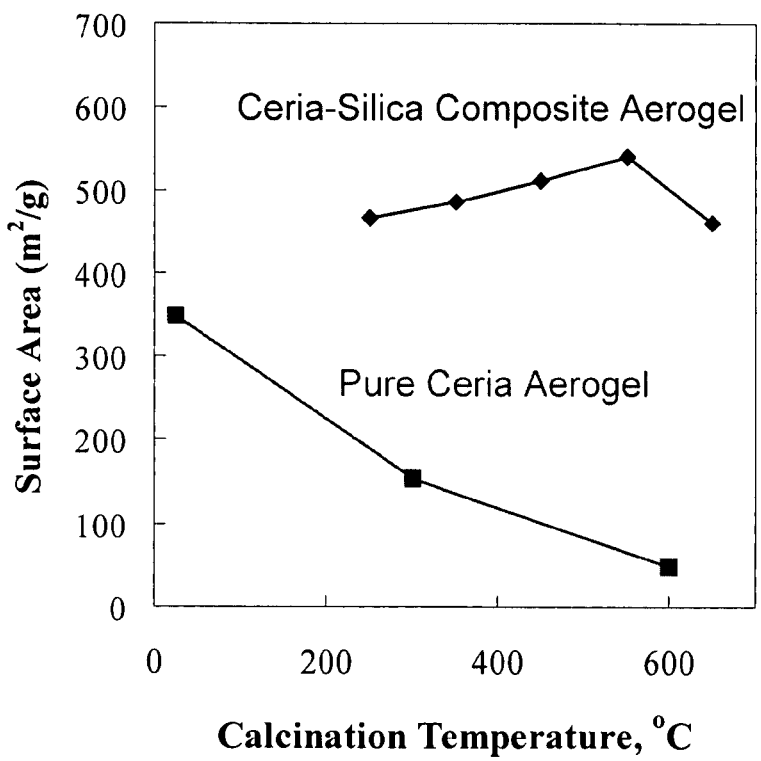
FIG. 1 is a graph of surface area ($m^2/g$) versus calcination temperature for 20% Ce loaded composite aerogels and pure ceria aerogels in accordance with one embodiment of the present invention.

Reference will now be made to exemplary embodiments, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

It must be noted that, as used in this specification and the appended claims, the singular forms "a," "an," and "the" include plural referents unless the context clearly dictates otherwise. Thus, for example, reference to "an aerogel" includes one or more of such materials, reference to "a metal species" includes reference to one or more of such species, and reference to "a treating step" includes reference to one or more of such steps.

Definitions

In describing and claiming the present invention, the following terminology will be used in accordance with the definitions set forth below.

As used herein, "coating" and "coated" refer to a separate and distinct layer of material from an underlying material. A coated material exhibits an identifiable boundary, e.g. diffuse or abrupt, between the coating material and the underlying material, e.g. support material.

As used herein, "surface area" refers to active surface area of the material as determined by BET measurement. Most often BET measurements are carried out by measuring nitrogen desorption.

As used herein, "stabilized" refers to a material which has been treated to increase thermal stability of the material. For example, a stabilized material can have less porosity reduction under heating to a specific temperature than an unstabilized material of substantially the same original surface area and/or support material composition. In some cases, a stabilized material can be an oxidized ceria, although any approach which affects interaction of the ceria with the silica aerogel sufficient to increase thermal stability can be suitable. Often the stabilization also decreases solubility of the aerogel.

As used herein, "ceria" refers to cerium oxide, i.e. $CeO_2$ and $Ce_2O_3$, and these terms are used interchangeably and synonymously. Ceria can include various forms of cerium, e.g. cerium IV and cerium III. However, ceria does not include other cerium containing compounds which include both cerium and oxygen along with other atoms. Rather, as is understood in the art, ceria refers exclusively to cerium oxide as discussed in this definition.

As used herein, "cerium loading" refers to percent by weight of cerium in the composite ceria-coated aerogel, i.e. not calculated based on ceria which includes the weight of oxygen.

As used herein, "alcogel" refers to an aerogel which is wet, e.g. immersed or soaked in a wetting fluid. An alcogel can be formed by contacting an aerogel with a fluid which does not dissolve the porous structure, e.g. under supercritical conditions, or the alcogel can be formed through synthesis using conventional techniques, e.g. alkoxide-based sol gel chemistry, aqueous condensation of silicon-compounds, or the like, which techniques can be optionally catalyzed using a suitable catalyst. Suitable wetting fluids can include, but are in no way limited to, ethanol, tetrahydrofuran (THF), methanol, acetone, water, or combinations thereof.

As used herein, "calcination" refers to a process where materials are heated for a time under oxygen conditions sufficient to form oxides of a particular material, e.g. cerium compounds such as CAN and cerium ac can be calcined to ceria.

As used herein, "incorporating" of metals refers to association of a metal with a material. Incorporation of metals can include a wide variety of associations such as, but not limited to, covalent bonds, ionic bonds, hydrogen bonding, other electrostatic attractions, intimate mechanical bonding, or the like. Typical configurations can result in covalent bonds, ionic bonds, and/or mechanical bonding; however the present invention is not so limited.

As used herein, "reacting" refers to any interaction between the identified materials which results in an association of the identified materials. A reaction of materials can result in formation and/or destruction of chemical bonds, ionic association, or the like.

As used herein, "multi-metallic compound" refers to a material including more than one type of metal. Multi-metallic compounds can include complex metal salts, alloys, mixed metal domains, or other species including a plurality of metals. Typically, the multi-metallic compound can include metals which are complex metal salts and can be bound via oxide bridging, cation-anion association, or the like. However, metals which are in various oxidation states can also be suitable for some applications, e.g., prior to activation of a catalyst or oxidation.

As used herein, "metal complex" refers to any metal-containing species where at least one metal atom is associated with a compound via interatomic forces, e.g., van der Waals, ionic bonding, covalent bonding, etc. Metal complexes can include metal complexes such as metallocenes, metal chelates, or other metal coordination complexes.

As used herein, "pretarget" refers to a complex or compound prior to association with a substrate. A species becomes a target once it is associated with a substrate. In this way, specific metal-containing species can be prepared as targets for other metal species in the manner described herein.

As used herein with respect to an identified property or circumstance, "substantially" refers to a degree of deviation that is sufficient so as to measurably detract from the identified property or circumstance. The exact degree of deviation allowable may in some cases depend on the specific context. Thus, for example, removal of "substantially all" of a material leaves either no or only trace amounts of the material. Most often, one or more elements will be completely absent from the composition of interest, rather than a mere change in compositional percentages. Similarly, a "substantially enhanced" property has a statistically significant deviation, e.g., as in catalytic activity.

As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussion below regarding ranges and numerical data.

As used herein, a plurality of items, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As a non-limiting example of this principle, although silica aerogels and alumina aerogels are listed as substrates each has unique properties which may make it more or less suitable in a given circumstance, e.g. silica aerogels can have a higher thermal stability which make these two substrates significantly different in many applications. It is not the purpose of this specification to exhaustively outline every possible distinction among potentially useful components, but rather to illustrate the principles of the present invention, often with the use of such lists.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 10 to about 50" should be interpreted to include not only the explicitly recited values of about 10 to about 50, but also include individual values and sub-ranges within the indicated range. Thus, included in this numerical range are individual values such as 20, 30, and 40 and sub-ranges such as from 10-30, from 20-40, and from 30-50, etc. This same principle applies to ranges reciting only one numerical value. Furthermore, such an interpretation should apply regardless of the breadth of the range or the characteristics being described.

Invention

In one embodiment of the present invention, a ceria-coated aerogel can include an aerogel support material having a stabilized ceria coating over at least a portion of porous surfaces throughout the aerogel support material. In accordance with one aspect of the present invention, the ceria-coated aerogels can have a stabilized ceria coating which improves the thermal stability of the composite aerogel well above temperatures conventionally achievable using conventional aerogels. In one detailed aspect the ceria-coated aerogels of the present invention can have less than about 5% loss in surface area up to about 650° C. compared to a surface area of the ceria-coated aerogel at 25° C. Thus, the composite ceria-coated aerogels of the present invention are substantially free of loss in surface area over a wide range of catalytically useful temperatures. Generally, the composite aerogels of the present invention are substantially free of losses in surface areas, e.g. less than 5% loss, up to a temperature of about 400° C., and preferably up to a temperature of about 650° C. As a general guideline, the ceria-coated aerogels of the present invention can be stable up to at least the thermal stability of the aerogel support material. Many aerogels have relatively high temperature thermal stability, e.g. silica is about 1200° C. In some cases the ceria-coating may be stable at temperatures beyond the thermal stability of the aerogel support.

The composite ceria-coated aerogels of the present invention can have a ceria coating which covers at least about 75% of a surface area of the aerogel support material, and preferably from about 10% to about 100% of the surface area of the aerogel support material. Thus, in some cases, a low ceria coating can be useful where the ceria is used as an activator for a secondary metal species. In such cases, a ceria coating which covers from about 10% to about 20% can be useful, although other coverages can also be useful. Yet another significant benefit of the composite aerogels of the present invention is the thermal stability combined with very high surfaces areas. Although the surface areas can vary somewhat depending on the specific aerogel support material chosen, as a general guideline surface areas can vary from about 300 $m^2/g$ to about 1000 $m^2/g$, and preferably from about 400 $m^2/g$ to about 900 $m^2/g$. In another detailed aspect of the present invention, the ceria-coated aerogel can have a cerium loading from about 10% to about 50%, and preferably from about 30% to about 45%. These ranges are preferred for silica aerogels, while the percentages can be adjusted accordingly for other aerogel materials, depending on respective densities, e.g. titania is about 1.6 times more dense than silica. The amount of ceria deposited, however, is a function of the cerium precursors, i.e. the solubility of the precursor in a particular solvent.

Support Material

The aerogel support material can include, comprise primarily, or consist essentially of, almost any suitable aerogel such as, but not limited to, silica aerogel, alumina aerogel, zirconia aerogel, and composites or combinations thereof. Silica aerogel is currently a preferred aerogel support material for a variety of reasons such as surface areas, weight, expense, and thermal stability. In one detailed aspect, the aerogel support material can consist essentially of silica aerogel. In another alternative embodiment, the aerogel support material can be a composite aerogel. For example, a titania aerogel can be doped with silica to increase thermal stability.

Aerogel supports can be used which have, or can be modified to have, an active group on the surface thereof. The active group can be any group which can be used as a point of attachment for a metal complex. The active group can typically be hydroxyl, although any group such as, but not limited to, species which can serve as ligands (e.g., electron pair donors) to metal centers, whether by direct attachment or through substitution, e.g., of a proton can also be used, for example, by acidifying the alcogel or carbanion reaction with surface hydroxyl.

Because of their unique properties, aerogels can be particularly useful for production of catalytic materials using the methods of the present invention. A wide variety of aerogels can be used in the present invention such as, but not limited to, those based on silica, alumina, titania, tungsten oxide, iron oxide, tin oxide, nickel tartarate, cellulose, polymers, or the like. In one aspect, the aerogels can be silica, alumina, or titania aerogels. Typical characteristics of aerogels include surface areas greater than about 100 $m^2/gm$, and pore radii greater than about 1-10 nm.

Ceria-Coating of Support Material

The composite ceria-coated aerogel materials of the present invention can be formed by depositing a cerium compound via solution deposition on an alcogel or aerogel support material or via vapor deposition on an aerogel support material. Accordingly, in accordance with one embodiment of the present invention, a method of preparing a ceria-coated aerogel can include depositing a cerium compound on an alcogel support material to form a cerium alcogel. The alcogel can be formed by contacting an existing aerogel with a fluid which can be used to non-destructively saturate the aerogel to form an alcogel structure. Alternatively, the alcogel support material can be formed from raw materials using conventional sol gel or other processes.

In one specific aspect of the present invention, the alcogel support material can be contacted with a cerium solution of the cerium compound for a sufficient time to coat surfaces of the alcogel with the cerium compound to form the cerium alcogel. Alternatively, the step of depositing the cerium compound can include contacting an aerogel support material, i.e. not alcogel, directly with a solution of the cerium compound.

The cerium solution can include a wide variety of cerium compounds which can be deposited on alcogel surfaces. Non-limiting examples of suitable cerium compounds can include cerium (IV) alkoxide, cerium acetyl acetonate, ceric ammonium nitrate, ceric ammonium sulfate, and combinations thereof. Currently, the preferred cerium compound is ceric ammonium nitrate, however, other cerium compounds can also provide acceptable cerium loading and ease of deposition.

In one embodiment of the present invention, once the cerium compound has been deposited, the cerium alcogel can be dried to form a precursor aerogel. For example, the cerium alcogel can be dried by subjecting the cerium alcogel to supercritical conditions and then drying to form the precursor aerogel. Supercritical conditions can help to minimize loss of surface area, shrinking, and deformation of the aerogel during drying and can help to introduce a wetting fluid without destroying the aerogel structure. Although exact conditions can vary, generally the ceriumn alcogel can be first equilibrated with liquid carbon dioxide at a pressure generally between about 1100 psig and about 2000 psig while maintaining a temperature below 32° C. to remove the preparation solvent from the alcogel. The resulting solution of liquid carbon dioxide and preparation solvent can be dynamically exchanged with liquid carbon dioxide and simultaneous venting. After adequate exchange, the system can be heated to between about 32° C. and about 50° C. for about 60 minutes to achieve supercritical conditions. The supercritical carbon dioxide is subsequently vented at an even rate for about 60 minutes to form the precursor aerogel. Completion of carbon dioxide/preparation solvent exchange can be determined by observing the relative absence of the preparation solvent in the exchange effluent. Additionally, drying can be achieved via supercritical conditions of the preparation solvent.

The precursor aerogel can be treated to form a stabilized ceria coating over at least a portion of the precursor aerogel to form a ceria-coated aerogel. Thus, in one aspect of the present invention, the deposited and dried cerium compound can be converted to ceria. In one detailed aspect, the precursor aerogel can be subjected to calcining at a temperature and time sufficient to form the stabilized ceria coating. Calcining functions to remove excess liquids, extraneous ligands around the cerium, and destroys the nitrate counterions. Calcination can most often be performed in a furnace, e.g. muffle furnace, under oxygen conditions. Oxygen conditions can be provided by either a dedicated oxygen supply or by exposure to ambient air. In one aspect, the precursor aerogel can be heated to about 450° C. at a rate of about 5° C./min and then held at about 450° C. for about 4 hours under air. Alternatively, strong oxidizing agents such as ozone may be used at relatively lower temperatures to convert the cerium compound to ceria.

In another alternative aspect, the method of preparing a ceria-coated aerogel can include vapor depositing a cerium compound on an aerogel support material to form the ceria-coated aerogel. In one detailed aspect, the ceria can be directly vapor deposited on the aerogel support material. Alternatively, a non-ceria cerium compound can be vapor deposited such that an additional treatment of the cerium compound can be performed to form ceria. For example, a vapor deposited cerium compound can be subjected to calcining as described in connection with the solution deposition approach.

Regardless of the approach used to form a ceria coating over portions of the aerogel support material, the stabilized ceria coating can be a substantially monolayer of ceria. In this way, relatively expensive ceria can be selectively placed at surfaces which are most likely to actively contribute to catalytic activity. Rather than having substantial amounts of ceria or cerium compounds which are isolated or buried underneath other materials, effectively negating their catalytic contributions, the methods of the present invention allow for carefully directed and targeted placement of ceria. The ceria coating can range in thickness from about 0.4 nm to about 100 nm, although about 0.5 to about 1 nm as a monolayer is preferred.

In yet another optional embodiment of the present invention, the alcogel support material can be silylated prior to the step of depositing the cerium compound. Silylation can include contacting the alcogel support material with hexamethyidisilazane, and combinations thereof, or other functional silylation agents. Silylation can also stabilize the aerogel to contact with a wetting fluid. The composite aerogels of the present invention can also exhibit higher stabilities in the presence of liquids which would degrade conventional non-composite aerogels.

Metal Complexes and Formation of a Multi-Metallic Compound with Ceria Coating

The composite ceria-coated aerogels of the present invention are particularly suited for formation of heterogeneous catalysts such that the ceria can be associated with one or more additional catalytically active metals or compounds to form a multi-metallic compound. A variety of techniques can be used to deposit additional metals, such as redox targeting, precipitation of metals, or the like. In one currently preferred approach, the additional catalytically active metal species can be selectively deposited and treated to form a multi-metallic compound with the ceria using a targeted reduction-oxidation approach as described in U.S. patent application Ser. No. 11/215,828, filed Aug. 29, 2005, which is incorporated herein by reference in its entirety. This basic targeting approach is described in greater detail below and allows for improved catalytic activity by more evenly distributing different metals across active surfaces, rather than having localized domains of each metal species.

The additional catalytically active metal species can include a wide variety of materials, depending on the desired catalytic activity and associated process for which the material will be used. Non-limiting examples of suitable catalytically active metal species include cobalt, ruthenium, iron, titanium, vanadium, chromium, zirconium, osmium, platinum, palladium, silver, nickel, molybdenum, tungsten, and compound or combinations thereof. Cobalt, ruthenium, and iron-based species are particularly suitable for many applications and are relatively inexpensive.

As mentioned above, additional catalytic metals can be associated with the ceria coating to form a multi-metallic compound. The multi-metallic compound can be formed with the stabilized ceria coating by reacting a secondary metal complex with the stabilized ceria coating in an oxidation-reduction reaction to form the multi-metallic compound. Thus, the additional metal species can be specifically targeted and deposited uniformly such that the ceria and additional metal species are associated with one another throughout substantially avoiding localized non-homogeneities.

The additional metal-containing species can be coordination or organometallic complexes of metals which are catalytically active in the ground state and/or as an oxide. Each of the metal-containing species can be selectively deposited such that control of concentrations and placement of second or additional metal atoms can be significantly improved. Various metal-containing species are considered useful for the present invention. A wide variety of materials can be used which satisfy the criteria of reacting in a redox reaction to form a multi-metallic species with the ceria coating. In one aspect, the metal-containing species can be gaseous. Alternatively, the metal-containing species can be provided in a liquid form and used to replace suitable wetting fluids in an alcogel.

Several non-limiting examples of suitable metal-containing species can include metal complexes having pentadienyl ligands, such as 2,4-dimethylpentadienyl, 6,6-dimethylcyclohexadienyl, 3-methylpentadienyl, and other dienyl ligands, allyl ligands, cyclopentadienyl ligands such as aromatic cyclopentadienyl, aromatic pentamethylcyclopentadienyl, cyclooctenyl, cyclooctadiene, cyclooctadienyl, hexamethylbenzene, acetate, other coordination complexes such as acetyl acetonate (acac), halides, nitrogen bound species, heteroatom species, fused rings of two to about six rings, and combinations or derivatives thereof. Generally, a wide variety of ligands can be used which have sufficient activity to deliver the metal to the substrate or target metal species. In addition, the ligands can include various substituents such as, but not limited to, C1 to C20 alkyls which are straight chained or branched, silyls, aromatic compounds, aryl compounds, and derivatives or substituted members thereof. Under some conditions, metal-containing species referred to as 19 electron configuration species such as cobaltocene can be particularly preferred. In another detailed aspect of the present invention, the additional metal complex can be a metal dienyl complex, ferrocene, cobaltocene, ruthenocene, cerium alkoxide, or the like. Catalytically active metals can be complexed with a wide variety of ligands such as, but not limited to, 2,4-dimethylpentadienyl, aromatic cyclopentadienyl, aromatic pentamethylcyclopentadienyl, cyclooctenyl, cyclooctadiene, cyclooctadienyl, hexamethylbenzene, acetate, acetyl acetonate (acac), halides, nitrogen bound species, heteroatom species, allyl, other ligands commonly used in coordination complexes, and the like.

Examples of suitable oxidizing agents which can be obtained from various metal-containing species include, but are not limited to, osmium tetraoxide, ruthenium tetraoxide, ferrocinium, or other metal oxides or complexes which will undergo reduction by the chosen reducing agent. Examples of suitable metal-containing species which can serve as reducing agents include cobaltocene, open cobaltocene, 19 electron iron cyclopentadienyl complexes, iron methylcyclopentadienyl complexes, ruthenium dimethylpentadienyl complexes, other 19 electron organometallic compounds, organometallic or coordination complexes which are good reducing agents. Certain metal-containing species can act as a reducing agent or as an oxidizing agent.

In an additional aspect of the present invention, the metal of the additional metal-containing species can be any metal which can be incorporated into such species and is useful for a final intended application. Non-limiting examples of metals which can be used include Fe, Co, Ru, Ti, V, Cr, Zr, Os, Pt, Pd, Ag, Ni, Mo, W, oxides or alloys thereof, or any other catalytically active metal. In one aspect, the metal can include Fe, Co, Ru, or combinations thereof. For example, Fe, Co, and Ru, gaseous metal-containing species are readily available. Similarly, analogous volatile sources are available for Ti, V, Cr, Fe, Zr, Os, and other metals. Strong and immediate catalyst metal-support interactions allow for effective incorporation of catalyst, with the potential for more efficient catalyst dispersal over the surface. Further, there is an increased degree of contact between the two metals rather than large areas of a single metal. The resulting increased exposure reactants to multiple metals during a reaction can lead to higher reactivities. Without being bound to a particular theory, it is thought that such improved reactivities are the result of the combined action of each type of metal in supporting specific reactive intermediates.

Metal complexes which are suitable for use in the present invention can include a wide variety of metal complexes as discussed above. In one embodiment, the additional metal complex can have the general formula

$$M-L_n \qquad \text{Equation 1}$$

where M is a transition, actinide, lanthanide, or main group metal and $L_n$ are n complexing ligands. Although M can be any catalytically active metal, transition metals tend to provide exceptional catalytic activity. In one embodiment, currently preferred metals include Fe, Co, and Ru. Each of $L_1$ through $L_n$ can be independently selected from suitable ligands and can be the same or different. Suitable ligands can include any dienyl ligands, allyl ligands, cyclic rings containing from six to eight members in the ring, or other similar complexing ligands. Specific, non-limiting examples of suitable ligands can include 2,4-dimethylpentadienyl, cyclooctenyl, aromatic cyclopentadienyl, hexamethylbenzene, cyclohexadienyl, cyclooctadienyl, cycloheptadienyl, acetate, halides, acac, aromatic, aryl, fused rings, and derivatives or substituted compounds thereof. Metal complexes containing a pentadienyl ligand can also be particularly suitable for use in the present invention.

Once the ceria coating and metal complexes have been reacted, any non-oxidized metal can be oxidized sufficient to remove substantially all organic portions to form a multi-metallic oxide compound. Oxidation can be performed by heating in an oxygen environment. Additionally, in some embodiments it can be desirable to reduce the multi-metallic oxide compound to their respective base metal having an oxidation state of zero. Reduction can be performed, for example, by heating under a hydrogen stream. This can be readily done in situ in a reactor immediately prior to use, although reduction can be performed at any time. As a result, the final activated catalyst is a multi-metallic compound having improved catalytic activity.

In another alternative aspect of the present invention, additional metal complexes can be reacted with the multi-metallic compound or multi-metallic oxide. In this way, the thickness of the multi-metallic coating can be increased. Further, as additional metal-containing species are reacted a greater number of reactive sites become available for incorporation of additional metal-containing species. Thus, the relative content of co-catalysts can be carefully controlled to achieve a desired ratio. This can help to optimize catalytic activity, cost, and stability depending on the desired application.

Further, additional materials can be added in order to produce a specific commercial product. For example, promoter or inhibitors can be added to carefully tailor catalytic activity, selectivity, stability, and/or lifetime of the catalyst material. Non-limiting examples of potentially suitable promoters include alumina, calcium oxide, potassium oxide, chlorides, sulfides, and the like. Similarly, a suitable inhibitor can include, but is in no way limited to, halogenated compounds, e.g. soluble fluoride salts. The selection of specific additives will depend on the catalyst material and the intended application and can be designed by those skilled in the art of catalysis and reaction engineering based on the teachings herein described.

Applications for the ceria-coated composite aerogels of the present invention can include, but are certainly not limited to, hydrogen production via water gas shift reactions, removal of trace carbon monoxide from hydrogen fuel in a fuel cell, steam reforming, methanol synthesis, butane reforming, preferential oxidation of carbon monoxide, automotive exhaust treatment, and the like.

EXAMPLES

The following examples illustrate various methods of making aerogel supported multi-metallic catalysts in accordance with the present invention. However, it is to be understood that the following are only exemplary or illustrative of the application of the principles of the present invention. Numerous modifications and alternative compositions, methods, and systems can be devised by those skilled in the art without departing from the spirit and scope of the present invention. The appended claims are intended to cover such modifications and arrangements. Thus, while the present invention has been described above with particularity, the following Examples provide further detail in connection with several specific embodiments of the invention.

Ceria Coating of Aerogel Support Material

Silica aerogels can be purchased commercially, or conveniently prepared by standard procedures. Solution phase incorporation of ceric ammonium nitrate (CAN) was accomplished by first replacing the solvents remaining from preparation of the alcogel and which include ethanol, water, and THF in a 11.0 mL solid monolithic silica alcogel through a single equilibration with ethanol (35 mL) and 3 subsequent equilibrations with acetone (35 mL each), after which the external solvent was replaced by an acetone solution of CAN. Subsequent equilibration led to an even distribution of cerium throughout the entire solution volume, within and outside of the alcogel. Cerium contents up to 40% (w/w) were readily achieved and higher loads may be possible, e.g. by heating to increase solubility, multiple incorporation steps, i.e. repeating the solution, vapor or supercritical cerium deposition. The solubility of CAN in the particular solvent limits the loading of cerium using this particular embodiment. The CAN-laden alcogel was placed in an autoclave and filled with liquid $CO_2$. The liquid $CO_2$ and acetone were exchanged at a temperature lower than 28° C. and at a pressure between 1400 psig and 2000 psig. Concurrently with the exchange between liquid $CO_2$ and acetone, the autoclave was dynamically vented while being left open to the $CO_2$ source, to eliminate the acetone while maintaining an isobaric $CO_2$ environment. After approximately 4-6 hours of exchanging and venting, the $CO_2$ source and venting outlet were closed and the autoclave was heated beyond the $CO_2$ critical temperature (31.1° C.) to 50° C. After 1-2 hours of static supercritical conditions the autoclave was slowly and completely vented over 2-3 hours to yield the opaque and slightly yellow CAN-laden aerogel. Alternatively, the CAN-laden alcogel could be placed in a $CO_2$ atmosphere, pressurized and heated to supercritical conditions, and dried to yield the precursor aerogel. The cerium-laden precursor aerogel was sieved to 45-100 mesh, and then calcined in an air atmosphere at 450° C. for 4 hours to form a ceria-silica composite aerogel in accordance with one embodiment of the present invention.

Multi-Metallic Catalyst Supported with Ceria-Silica Composite Aerogel

A volatile organometallic palladium compound, ($\eta^3$-allyl)($\eta^5$-cylcopentadienyl) palladium, was chosen as the palladium precursor. This palladium compound is readily synthesized using well-known procedures and is appreciably air-stable. For gas-phase incorporation of the metal precursor, an appropriate mass of the compound and the composite aerogel were combined under a nitrogen atmosphere at room temperature. The appropriate mass can depend on the desired palladium loading. For example, about 20 mg of a palladium compound per 1 gm of the ceria-silica composite aerogel results in about 1% palladium loading. With mixing at room pressure, the palladium compound gradually disappeared and was homogenously absorbed by the composite aerogel to form a palladium-ceria-silica composite aerogel. The palladium-ceria-silica composite aerogel was calcined again at 450° C. After calcination the aerogel-supported catalysts were ready for use, without any further treatment.

Unsupported Catalyst Preparation

Catalysts using unsupported ceria with conventional aqueous incorporation (CAI) of Pd were prepared by mixing an aqueous solution of $Pd(NH_3)_4(NO_3)_2$ with an aqueous suspension of dense ceria. After impregnation, the water was removed via vacuum distillation (rotovap) and dried under vacuum. Catalysts using unsupported ceria (vide supra) and GPI Pd were prepared by mixing ($n^3$-allyl)($n^5$-cyclopentadienyl)palladium and the dried ceria under a nitrogen atmosphere. For samples prepared by both methods of Pd incorporation, the catalysts were calcined in an air atmosphere at 450° C. to yield a water gas shift (WGS) active catalyst.

For copper- or gold-containing catalysts, copper or gold nanoparticles were prepared by standard procedures, and suspended in the CAN solutions prior to incorporation of the ceria into the aerogel, so that the ceria and nanoparticles were incorporated simultaneously. This procedure was followed for comparison of pure ceria aerogels and ceria-coated aerogels of the present invention. Alternatively, a second metal species can be included with the cerium compound to simultaneously deposit each. Conversion of the resulting alcogel to the aerogel catalyst was then carried out as described for the palladium/ceria catalysts. Surface area determinations were made by nitrogen desorption (BET).

Results

FIG. 1 is a graph of surface area versus calcination temperature for 20% Ce loaded composite aerogels (produced via solution deposition of CAN) and pure ceria aerogels. The composite aerogels of the present invention retain high surface area at temperatures up to 650° C. while the pure ceria aerogels exhibit significant loss of surface area above 250° C. Further, the surface area of the ceria-silica composite aerogel was greater than about 450 $m^2/g$, which was substantially maintained at temperatures up to about 650° C. Specifically, the composite aerogel was substantially free of surface area loss over the tested calcining temperatures. Table 1 illustrates the surface area versus calcining temperature data used in FIG. 1.

TABLE 1

| Temp (° C.) | Surface Area ($m^2/g$) |
|---|---|
| 250 | 466 |
| 350 | 474 |
| 450 | 486 |
| 550 | 467 |
| 650 | 415 |

Thus, the composite aerogel had a loss of about 5.4% compared to 350° C. and about 1.3% loss compared to 250° C. The increase in surface area appears to be attributable to the conversion of CAN to lighter and smaller ceria which leaves greater open space among the porous network.

Figure 2:
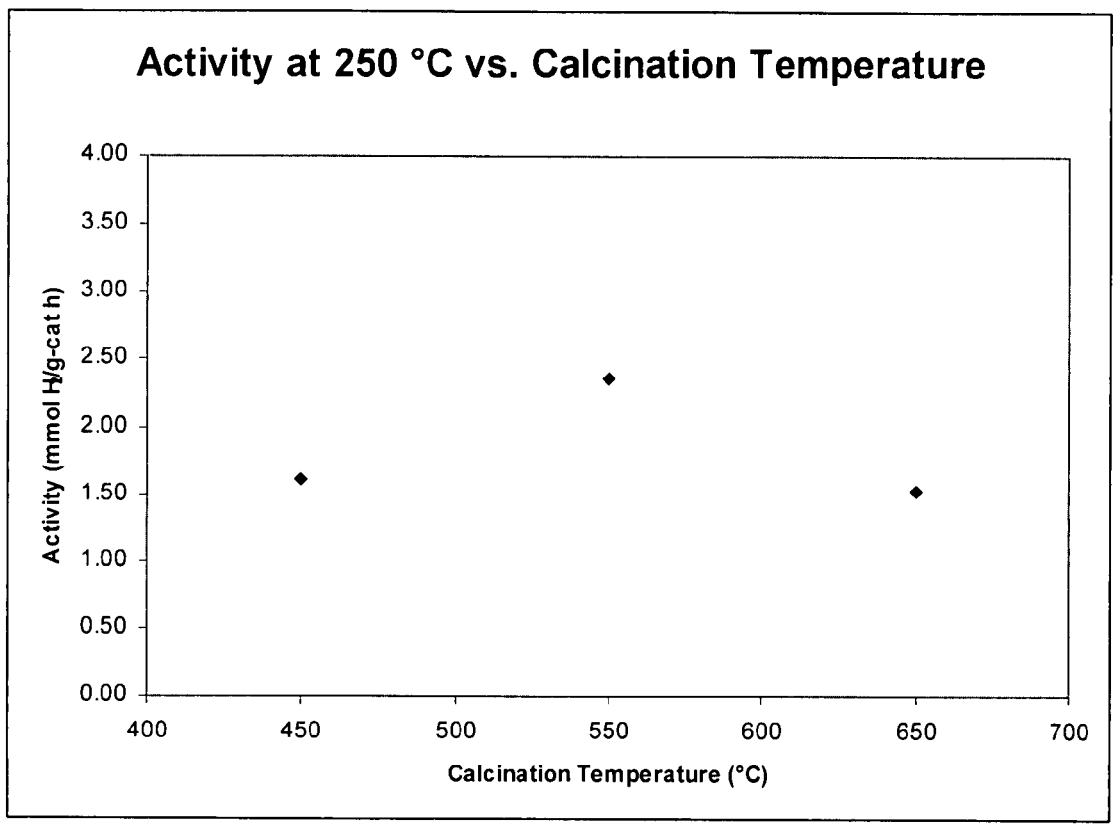
FIG. 2 is a graph of activity versus calcination temperature for water gas shift reaction at 350° C. for 20% Ce with 1% Pd in accordance with one embodiment of the present invention.

FIG. 2 is a similar graph of activity versus calcination temperature for water gas shift reaction at 350° C. for 20% Ce with 1% Pd. FIG. 2 illustrates that the activity is stable regardless of calcinations temperature.

Figure 3:
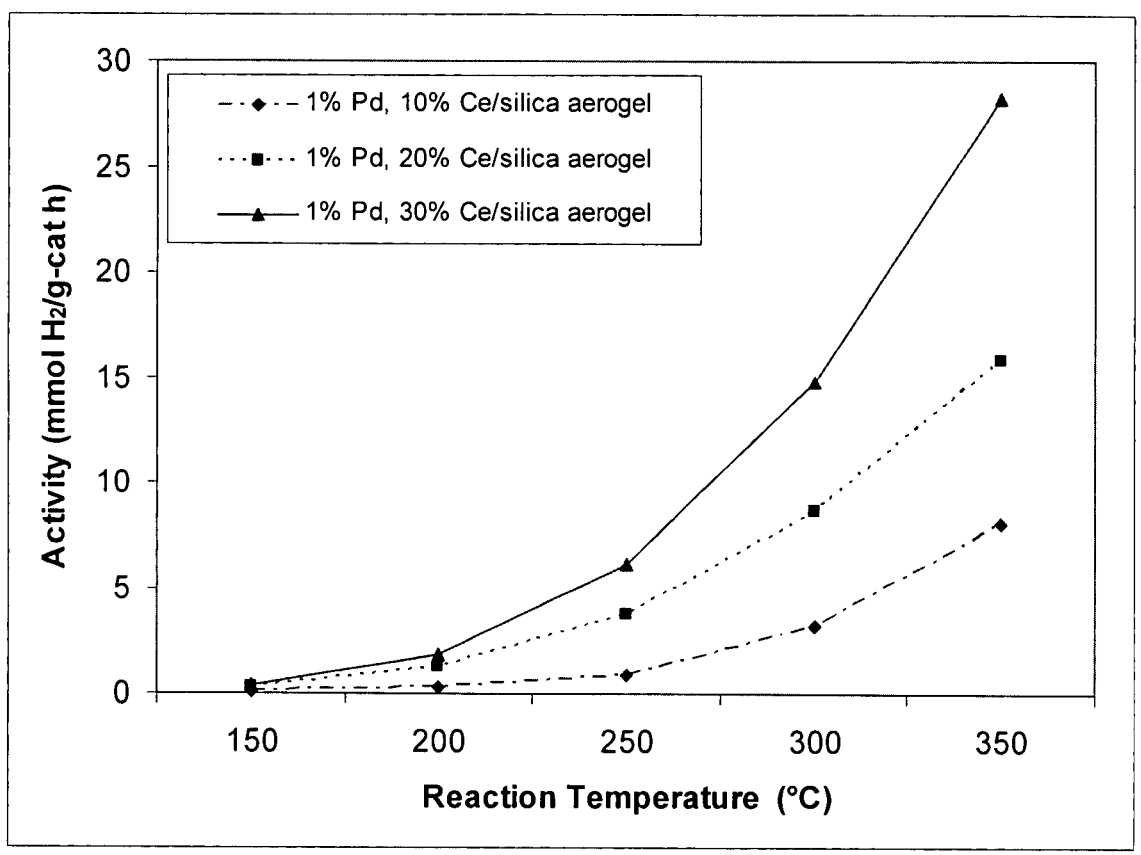
FIG. 3 is a graph of activity for the water gas shift reaction at various temperatures and comparing three different ceria-coated silica composite aerogels in accordance with embodiments of the present invention.
Figure 4:
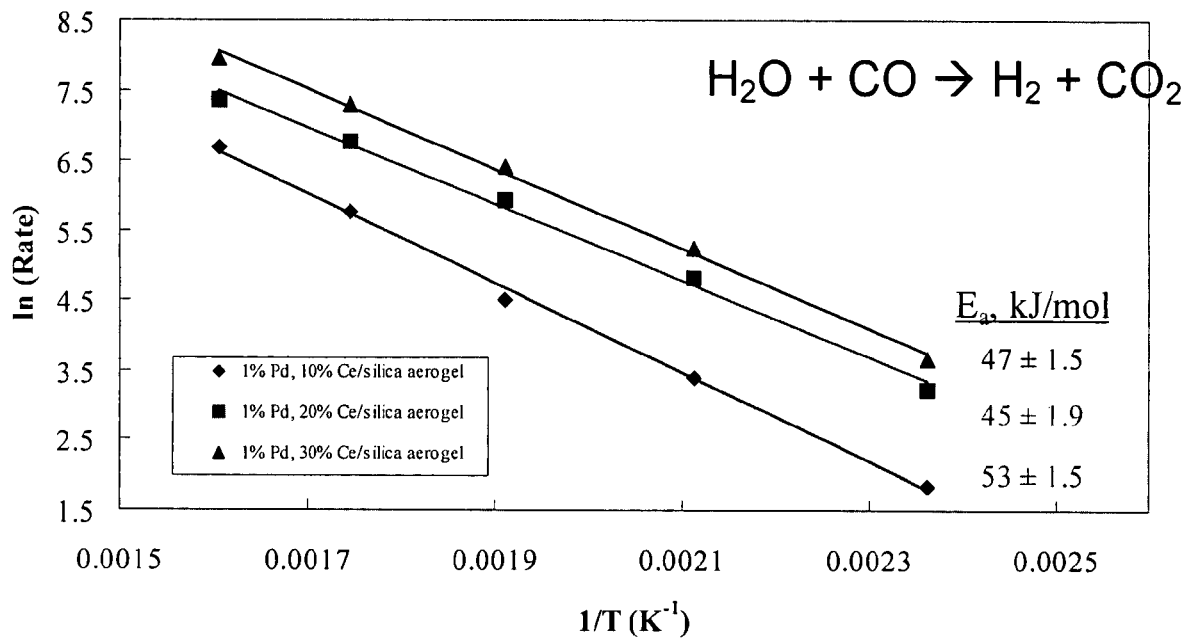
FIG. 4 is a graph of In(rate) versus inverse temperature allowing calculation of the activation energy ($E_a$) for each reaction.
Figure 5:
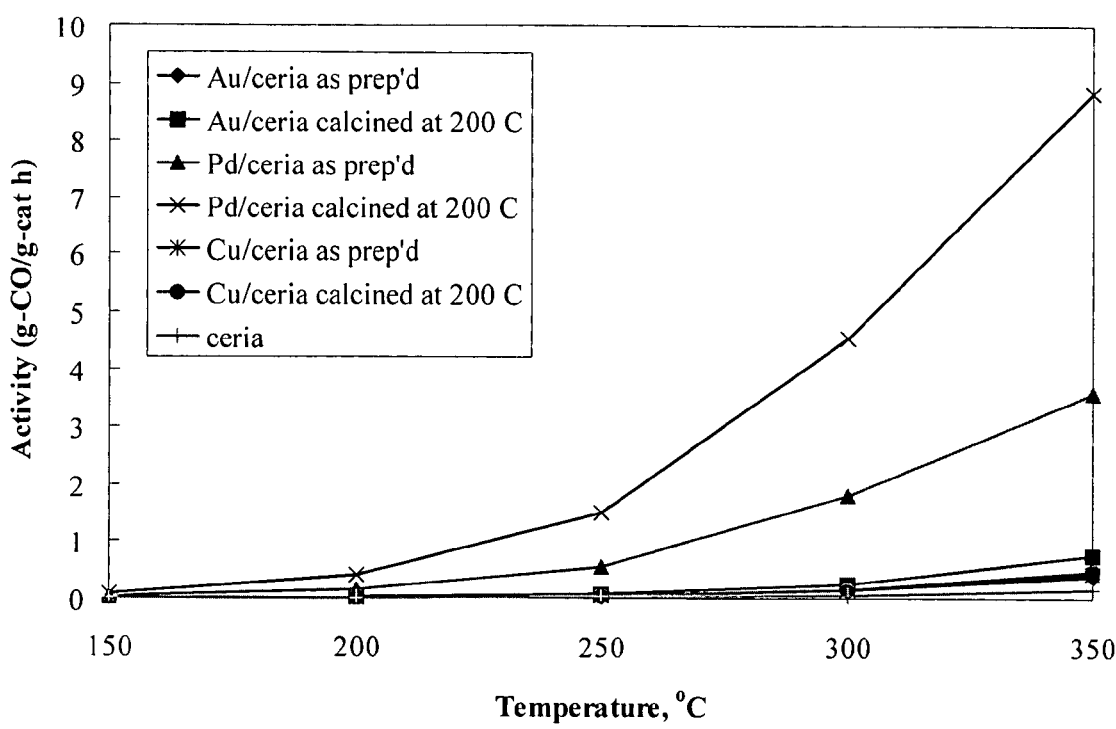
FIG. 5 is a graph of activity versus temperature for pure ceria aerogel in accordance with the prior art.
Figure 6:
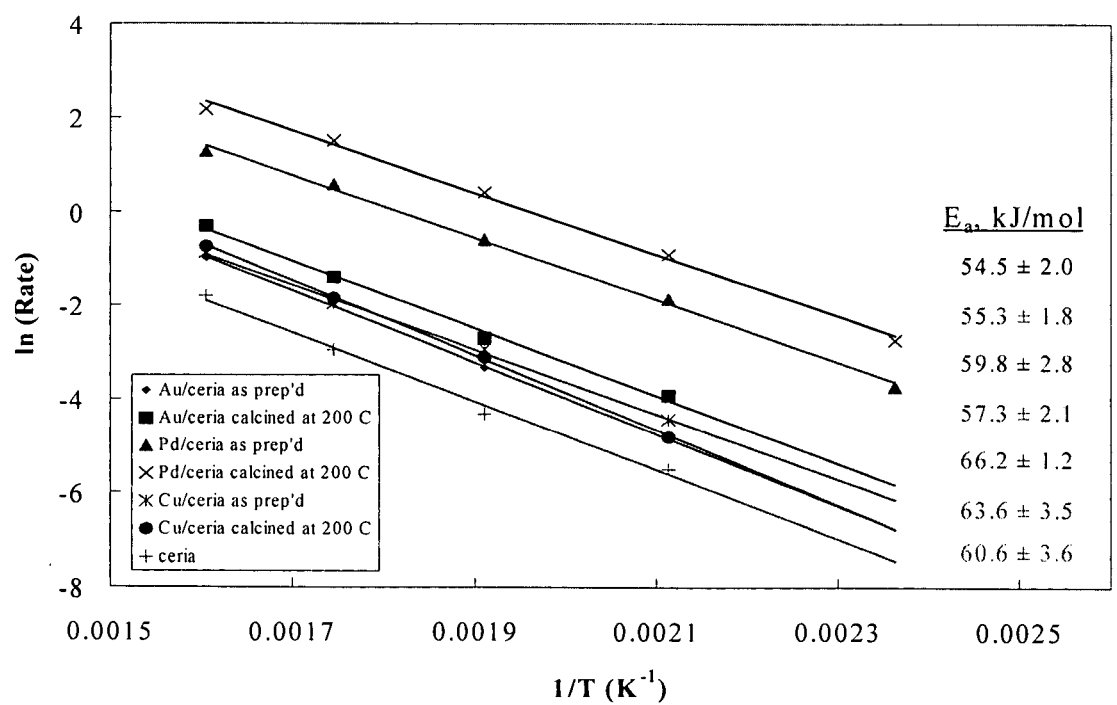
FIG. 6 is a graph of In(rate) versus inverse temperature for pure ceria aerogel in accordance with the prior art.

FIG. 3 is a graph of activity for the water gas shift reaction at various temperatures and comparing three different ceria-coated silica composite aerogels of the present invention formed using CAN as the deposition solution. It should be noted that these comparisons were between catalysts tested at different conditions. As can be seen from these results an increased cerium loading results in increased catalytic activity. Surface area of the aerogels also varied with cerium loading. For example, a nominal 30% cerium loading resulted in a surface area of 452 $m^2/g$, while a nominal 10% Ce loading resulted in a surface area of 619 $m^2/g$. Aerogel prepared from the same batch without cerium incorporation had a surface area of 687 $m^2/g$. FIG. 4 is another representation of the data from FIG. 3 allowing calculation of the activation energy ($E_a$) for each reaction. FIGS. 5 and 6 illustrate activity versus temperature for pure ceria aerogel. These graphs demonstrate the increased activity and stability of the composite aerogels of the present invention over conventional ceria aerogels.

Comparison of Incorporation Methods.

A comparison of the two incorporation methods (GPI and CAI) would not be feasible with silica aerogel-supported ceria. The preparation of silica aerogel-supported samples with CAI Pd is problematic without additional modifications of the silica aerogel, which would introduce additional variables, invalidating a direct comparison. Using unsupported ceria resolves these issues and was consequently used to directly compare the two incorporation methods. Comparing the GPI and the CAI of Pd on dense ceria reveals increased WGS activity (Table 4) for GPI. For identical loadings of Pd, activity for the WGS reaction is increased between 60 and 155% for the GPI method at 200° C. as shown in Table 4.

TABLE 4

WGS activity for GPI and CAI of Pd on unsupported ceria

| | Pd Incorporation | Activity ($mmol-H_2$/g-cat h) | | Improvement at 200° C. |
|---|---|---|---|---|
| Pd (%) | Method | 200° C. | 250° C. | w/ GPI |
| 1 | solution | 4.2 | 15.2 | 71% |
| 1 | gas phase | 7.2 | 23.3 | |
| 2 | solution | 4.3 | 15.2 | 155% |
| 2 | gas phase | 11.0 | 37.3 | |
| 5 | solution | 11.6 | 39.7 | 61% |
| 5 | gas phase | 18.7 | 57.9 | |

Figure 7:
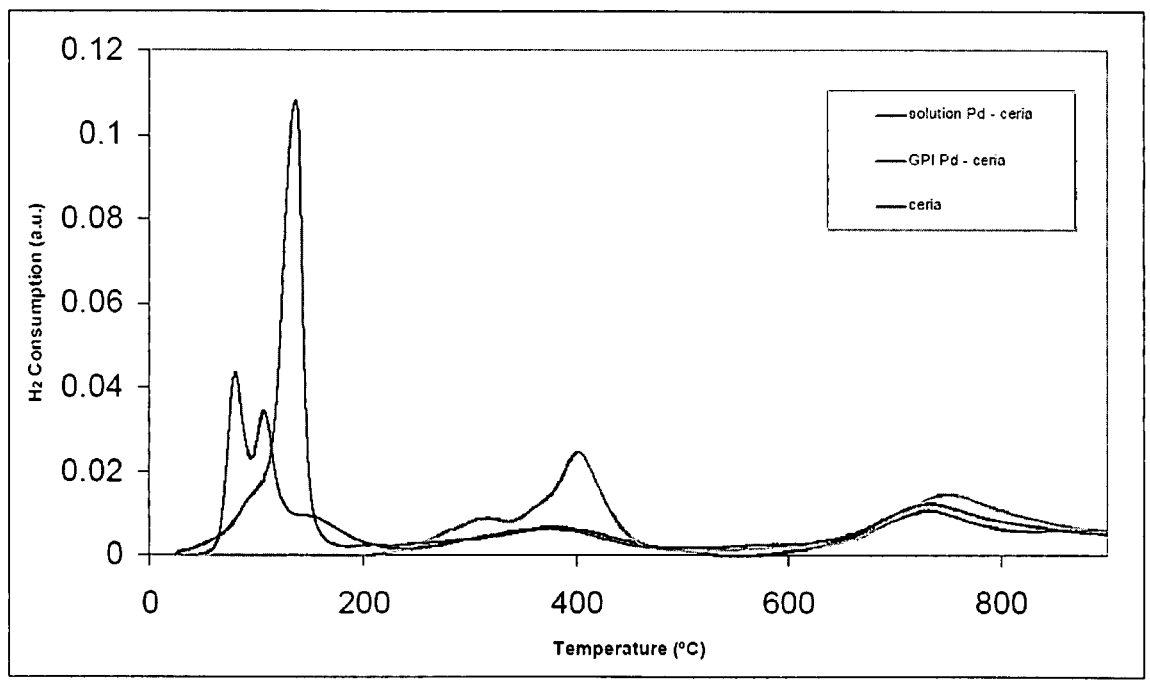

The enhanced activity for the GPI method is likely due to increased dispersion of the Pd. Investigation by XRD to determine the presence or absence of Pd clusters and the average crystallite size of Pd in the GPI samples did not show any peaks associated with Pd, which may be an indication of the absence of Pd clusters, suggesting well-dispersed Pd. However, the same observations were made for the XRD analyses of the CAI samples. This is likely due to the inability to observe peaks associated with Pd in the presence of the strong signals associated with ceria. It is also possible that while GPI yields smaller crystallites of Pd, both methods produce crystallites too small to quantifiably detect with XRD. Regardless, the TPR data also indicates a unique description of Pd in the GPI samples. The first peak of hydrogen consumption occurs at only 80° C. and a second peak at 107° C. for the GPI sample as shown in FIG. 7. The presence of precious metals shifts the reduction of surface ceria to significantly lower temperatures, with a shift to a temperature as low as 80° C. is significant. The two peaks indicating very low temperatures for hydrogen consumption are indicative of small particles of possibly two palladium types that are interacting with the possibly two types of surface ceria. This is also likely the basis for the enhanced activity; it is postulated that the intimate contact between the ceria and precious metal promoter is important. For the conventionally incorporated Pd catalyst the onset of hydrogen consumption occurs at 137° C. This is important since $H_2$ consumption correlates with activity. The $H_2$ consumption shows reduction of the ceria. Normally, ceria in the absence of Pd does not reduce until about 700 C, but when the ceria is intimate with Pd, the Pd catalyzes the reduction of the ceria. For the Pd-doped samples, the lower the temperature of $H_2$ consumption, the better the Pd/ceria interaction. Thus, $H_2$ consumption provides an indication of the effectiveness of the Pd deposition.

Characterization of Silica Aerogel-Supported Catalysts

Ceria-based WGS catalysts with relatively high surface areas, narrow ceria crystallite size distributions, and consequentially high activities have been prepared as shown in Table 5. Aerogel-supported ceria samples having surface areas above 600 m$^2$/g were obtained with nominal Ce loadings of 10% and well above 350 m$^2$/g for loadings of 40% Ce. Undoped aerogel prepared identically has a surface area of approximately 650-700 m/g. The ceria crystallite size is nearly independent of the ceria loading. With nominal ceria loadings between 10% and 40% the average crystallite sizes according to XRD analyses ranges between 6.5 nm and 8.0 nm.

TABLE 5

Textural properties of silica aerogel-support ceria.

| Ce (%) | BET Surface Area (M$^2$/g) | CeO$_2$ Crystallite Size (nm) |
|---|---|---|
| 10 | 619 | 7.0 |
| 20 | 561 | 6.5 |
| 30 | 452 | 7.0 |
| 40 | 385 | 6.5 |

As important as high surface area is the ability of a ceria-based catalyst to maintain its surface area at high temperatures. It has been previously shown that high-surface area cerias can dramatically lose surface area upon high-temperature treatment. Aerogel-supported ceria of the present invention do not show the same decrease in surface area at high temperatures. A series of silica aerogel catalysts containing 20% ceria and 1% Pd were prepared identically with the exception of calcination temperature. A temperature range of 250° C. to 650° C. in 100° C. increments was studied. Whereas WGS catalysts can lose activity and surface area concurrently, silica aerogel-supported catalysts did not lose significant surface area or activity with higher calcination temperatures as shown in Table 6. Table 6 shows properties and WGS activity of variably calcined silica aerogel-supported 1% Pd, 20% Ce catalysts where Pd was incorporated via gas-phase method.

TABLE 6

| Calcination Temperature (° C.) | CeO$_2$ Crystallite Size (nm) | BET Surface Area (m$^2$/g) | Activity (mmol-H$_2$/g-cat h) | |
|---|---|---|---|---|
| | | | 200° C. | 250° C. |
| 350 | 7.0 | 474 | 0.19 | 0.81 |
| 450 | 5.5 | 486 | 0.43 | 1.62 |
| 550 | 7.5 | 467 | 0.75 | 2.36 |
| 650 | 7.0 | 415 | 0.46 | 1.53 |

In fact, surface areas gradually increased as the calcination temperature is increased up to 550° C., with a loss in surface area with a calcination temperature of 650° C. Given that the ceria crystallite size remains roughly constant, the loss of surface area can be attributed to changes in the silica aerogel, not the active component of ceria.

Appreciable sintering of unsupported ceria can occur during calcinations at temperatures as low 600° C. In contrast, when supported on silica aerogel the crystallite size of the ceria remained roughly constant at 7 nm up to calcination temperatures of 650° C. The crystallite size of the supported ceria was also roughly constant after exposure to WGS reaction conditions up to 350° C. Activities for catalysts composed of 1% Pd and 20% Ce peak when the calcination temperature was 550° C. Activities decreased for catalysts calcined below 450° C., at either 350° C. or 250° C. This reduction in activity appears to be due to incomplete combustion of the residual organic fragment of the organometallic Pd precursor, limiting access of reactants to the metallic surface.

Ce Loading Effects.

Catalysts with 1% Pd and 10, 20 and 30% Ce were prepared and results indicate activity correlates with Ce loading as show in Table 7. Table 7 shows properties and WGS activity of Pd promoted, silica aerogel-support ceria catalysts where Pd was incorporated via the gas-phase method. A non-linear correlation between activity and ceria load may be attributed to significant and deleterious interactions between ceria and the support, most notable at low concentrations.

TABLE 7

| Pd (%) | CeO$_2$ (%) | Activity (mmol-H$_2$/g-cat h) | |
|---|---|---|---|
| | | 200° C. | 250° C. |
| 1 | 10 | 0.30 | 0.90 |
| 1 | 20 | 1.25 | 3.74 |
| 1 | 30 | 1.87 | 6.15 |

Pd Loading Effects.

Catalysts with 20% Ce and either 0, 1, 2, or 5% Pd were prepared to investigate the effects of Pd loading. Previously for a ceria- and palladium-based WGS catalyst, it was determined that higher loadings of Pd did not necessarily correlate with higher catalytic activity with respect to the WGS reaction and peak activity was found at Pd loadings less than 2%, but for GPI Pd, activity correlated with loading up to at least 5% Pd as shown in Table 8. Table 8 outlines WGS activities for Pd promoted silica aerogel-support ceria where the Pd was incorporated via the gas-phase method.

TABLE 8

| Pd (%) | CeO$_2$ (%) | Activity (mmol-H$_2$/g-cat h) | |
|---|---|---|---|
| | | 200° C. | 250° C. |
| 0 | 20 | 0.00 | 0.00 |
| 1 | 20 | 0.43 | 0.62 |
| 2 | 20 | 0.95 | 3.20 |
| 5 | 20 | 2.11 | 6.57 |

For CAI and other solution-based methods of incorporation, inorganic precursors tend to agglomerate at higher concentrations, leading to lower dispersions. Gas-phase incorporation of organometallic precursors typically yield well-dispersed metal particles on supporting materials, due to the lack of substantial nucleation processes and the equilibrium between dissolved and precipitated species, which are found in solution chemistry. The crystallite sizes of Pd on silica aerogel-supported ceria catalysts were determined by XRD analysis of fresh catalysts and catalysts that were used for WGS reaction studies. For a series of Pd loadings, ranging from 1 to 5% Pd, no peaks were found, apparently indicating the amorphous nature of very well dispersed Pd. The dispersion can approach a practical limit, e.g. about 90%. After the catalysts are used, and exposed to temperatures beyond what is expected for practical applications, the Pd is agglomerated as expected. The average crystallite sizes of the Pd in the used catalysts were determined to be approximately between 1 and 2 nm by XRD analyses, which still represents a high dispersion (greater than ~50%).

Activation Parameters

Differential rates and energies of activation were determined for the catalysts. Activation energies were found between 44 and 53 kJ/mol. These are similar to, although slightly higher than, values for unsupported Pd-ceria catalysts. In general, the activation energies for GPI catalysts were approximately 10% lower than CAI catalysts.

Deactivation

Palladium based catalysts have been shown to deactivate under WGS reaction conditions due to Pd agglomeration in the presence of CO. To test the rates of deactivation more quickly all the catalysts were run up to 350° C., a temperature well above the practical operating range of a low temperature WGS catalyst, and then reevaluated at 250° C. Decreases in activity were found for all catalysts tested. Differences in degrees of deactivation between GPI and CAI were found and are presented in Table 9 showing activity at 250° C., before and after high temperature excursion to simulate deactivation.

TABLE 9

| Pd (%) | Pd Type | Activity (mmol-H$_2$/g-cat h) | | Relative Decrease |
|---|---|---|---|---|
| | | 1$^{st}$ 250° C. | 2$^{nd}$ 250° C. | |
| 2 | solution | 15.2 | 10.3 | 32% |
| 2 | gas-phase | 37.3 | 17.3 | 54% |
| 5 | solution | 39.7 | 24.2 | 39% |
| 5 | gas-phase | 57.9 | 30.0 | 48% |

While the degrees of deactivations for the GPI catalysts are more dramatic, the actual activities are still greater for GPI catalysts. This can be attributed to a smaller starting particle size of GPI Pd and its subsequent greater initial rate of change of dispersion as the Pd agglomerates while still continuing to have greater dispersion than the CAI Pd when exposed to identical deactivation conditions. Given enough time at higher temperatures both Pd types, GPI and CAI, would both agglomerate to a convergent level of dispersion and consequential activity. Comparing the degree of deactivation between supported and unsupported ceria shows comparable levels of deactivation for the same loading method of Pd. Thus, changes in the dispersion of Pd and not the type of ceria appears to be more critical to the activity of the catalyst as shown in Table 10. Table 10 shows activity at 250° C., before and after high temperature excursion to simulate deactivation where all catalysts are 1% Pd incorporated via gas-phase method.

TABLE 10

| Ceria Type | Ce Load (%) | Activity (mmol-H$_2$/g-cat h) | | Relative Decrease |
|---|---|---|---|---|
| | | 1$^{st}$ 250° C. | 2$^{nd}$ 250° C. | |
| supported | 10 | 0.9 | 0.3 | 65% |
| supported | 30 | 6.2 | 2.0 | 67% |
| unsupported | | 23.3 | 8.7 | 63% |

Due to the increased dispersion of Pd derived from the GPI of a volatile organometallic compound, greater catalytic activity is achieved for the WGS reaction. The GPI method is a more economical approach to precious metal incorporation for catalysts for the WGS reaction and would likely provide comparable advantages for other catalytic applications involving precious metals. The GPI approach also has other advantages such as organometallic precursors can be readily modified to yield more opportunistic physical or chemical properties and are available for virtually all metals. Using silica aerogel as a support for ceria takes advantage of the properties of the silica aerogel such as high surface area that facilitates dispersion of supported materials, structural integrity, and favorable mass and heat transport. Silica aerogel-supported ceria yields well-defined and regular particles of ceria that are resistance to sintering and consequently do not deactivate at higher temperatures due to loss of surface area like other high-surface area cerias.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A ceria-coated aerogel, comprising an aerogel support material having a stabilized ceria coating over at least a portion of porous surfaces throughout the aerogel support material.

2. The ceria-coated aerogel of claim 1, wherein said ceria is a cerium (IV) oxide.

3. The ceria-coated aerogel of claim 1, wherein the ceria coating covers at least about 75% of a surface area of the aerogel support material.

4. The ceria-coated aerogel of claim 1, wherein the ceria-coated aerogel has a cerium loading from about 10 w. % to about 40 w. %.

5. The ceria-coated aerogel of claim 1, wherein the ceria-coated aerogel has a cerium loading from about 30 w. % to about 45 w. %.

6. The ceria-coated aerogel of claim 1, wherein the aerogel support material comprises a member selected from the group consisting of silica aerogel, alumina aerogel, zirconia aerogel, titania aerogel, and composites or combinations thereof.

7. The ceria-coated aerogel of claim 6, wherein the aerogel support material consists essentially of silica aerogel.

8. The ceria-coated aerogel of claim 1, further comprising a catalytically active metal species selectively deposited and treated to form a multi-metallic compound with the ceria.

9. The ceria-coated aerogel of claim 8, wherein the catalytically active metal species includes a member selected from the group consisting of cobalt, ruthenium, iron, cobalt, titanium, vanadium, chromium, zirconium, osmium, platinum, palladium, silver, nickel, molybdenum, tungsten, and combinations thereof.

\* \* \* \* \*

UNITED STATES PATENT AND TRADEMARK OFFICE
CERTIFICATE OF CORRECTION

PATENT NO. : 8,435,918 B2
APPLICATION NO. : 11/725168
DATED : May 7, 2013
INVENTOR(S) : Edward M. Eyring et al.

Page 1 of 1

It is certified that error appears in the above-identified patent and that said Letters Patent is hereby corrected as shown below:

In the Claims:

Column 20, line 62 in Claim 1 after "material" please insert --wherein the ceria-coated aerogel has less than about 5% loss in surface area when heated up to about 650°C compared to an original surface area of the ceria-coated aerogel at 25°C--.

Signed and Sealed this
Twenty-third Day of July, 2013

Teresa Stanek Rea
*Acting Director of the United States Patent and Trademark Office*